United States Patent
Zitting et al.

(10) Patent No.: US 6,517,081 B2
(45) Date of Patent: *Feb. 11, 2003

(54) MACHINERY SEAL

(75) Inventors: Gordon T. Zitting, Sandy, UT (US); Todd Hagen, Valley City, UT (US)

(73) Assignee: Macrotech Polyseal, Inc., Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 10/054,711

(22) Filed: Jan. 22, 2002

(65) Prior Publication Data

US 2002/0158419 A1 Oct. 31, 2002

Related U.S. Application Data

(63) Continuation of application No. 09/504,451, filed on Feb. 16, 2000, now Pat. No. 6,340,161.

(51) Int. Cl.[7] .................................................. F16J 9/12
(52) U.S. Cl. ........................ 277/459; 277/468; 277/488; 277/497; 277/548
(58) Field of Search ............................... 277/459, 446, 277/468, 494, 497, 548, 489, 491, 496, 546–8, 493, 482, 483, 447, 467, 488

(56) References Cited

U.S. PATENT DOCUMENTS

| | | | | |
|---|---|---|---|---|
| 1,188,622 A | * | 6/1916 | Carson | 277/446 |
| 1,357,949 A | * | 11/1920 | Brooks | 277/446 |
| 1,367,136 A | * | 2/1921 | Hachmann | 277/446 |
| 1,413,409 A | * | 4/1922 | Lackman | 277/446 |
| 1,476,657 A | * | 12/1923 | Tawney | 277/446 |
| 1,481,167 A | * | 1/1924 | White | 277/494 |
| 2,589,274 A | * | 3/1952 | Moratta | 277/464 |
| 2,876,052 A | * | 3/1959 | Burt | 277/468 |
| 2,910,332 A | * | 10/1959 | Madsen | 277/446 |
| 2,962,331 A | * | 11/1960 | Folkerts | 277/468 |
| 3,068,018 A | * | 12/1962 | Tydeman | 277/468 |
| 3,999,767 A | | 12/1976 | Sievenpiper | |
| 4,179,131 A | * | 12/1979 | Nussbaumer | 277/441 |
| RE31,005 E | | 8/1982 | Prasse et al. | |
| 4,917,390 A | * | 4/1990 | Lee et al. | 277/468 |
| 5,133,564 A | * | 7/1992 | Chang | 277/446 |
| 5,275,422 A | * | 1/1994 | Rehfeld | 277/468 |
| 6,340,161 B1 | * | 1/2002 | Zitting et al. | 277/459 |

OTHER PUBLICATIONS

Macrotech Polyseal, Seal Design and Manufacturing, MFS, CTS–1000 (Revised 10/93), Capped T–Seal High–Performance Piston Seal.

Macrotech Polyseal, Inc., MPI, TSM–1000, T–Seal Industrial Series 100–400, Piston and Rod Applications.

Shamban Industrial Products, Turcon Glyd Ring T.

* cited by examiner

*Primary Examiner*—Anthony Knight
*Assistant Examiner*—Alison K. Pickard
(74) *Attorney, Agent, or Firm*—TraskBritt

(57) ABSTRACT

A seal assembly for a groove or seal gland in a relatively displaceable machine part for sealing an axial machine part extending therethrough comprises a pair of annular seal elements and a support element disposed between the annular elements and radially extending wall of said groove. The annular seal elements have an axial slot therein and a key portion extending therefrom, shaped to engage the axial slot. The seal elements are arranged in an inverted nesting relationship to provide superior sealing characteristics when biased toward the machine part by said support element.

4 Claims, 2 Drawing Sheets

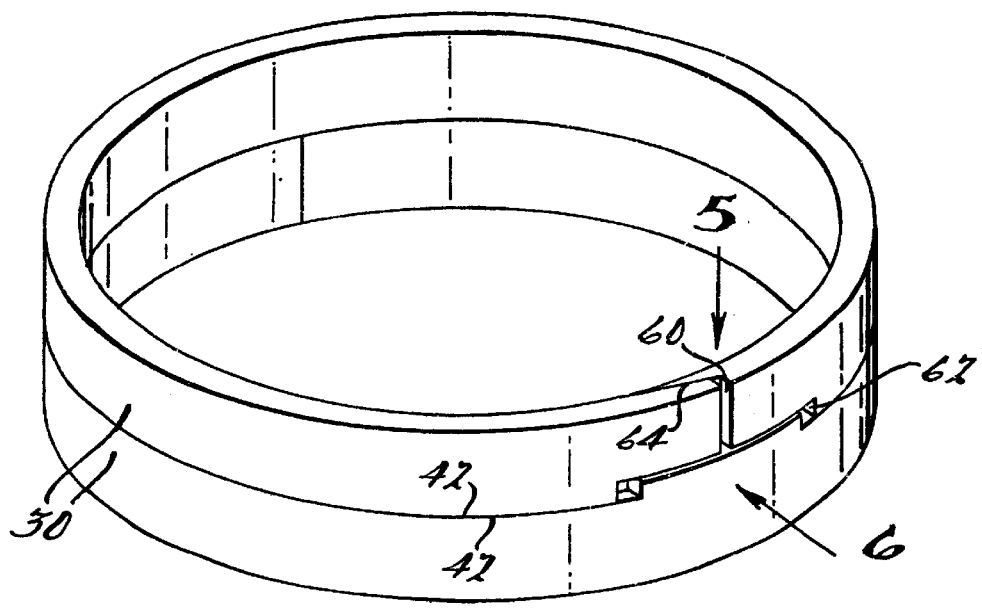
FIG. 4.
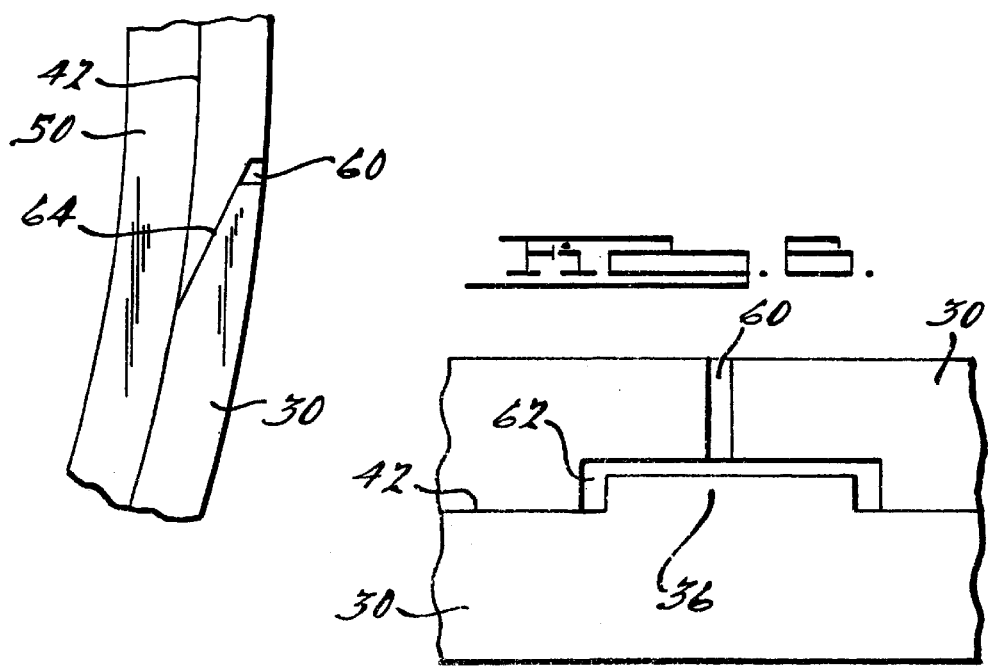
FIG. 5.
FIG. 6.

MACHINERY SEAL

CROSS-REFERENCE TO RELATED APPLICATION

This application is a continuation of application Ser. No. 09/504,451, filed Feb. 16, 2000, which issued as U.S. Pat. No. 6,340,161 on Jan. 22, 2002.

BACKGROUND OF THE INVENTION

The instant invention relates generally to machinery seals disposed in grooves or seal glands to provide a fluid seal between relatively moving machinery parts. Specifically, the invention comprises a pair of annular seal elements arranged in an inverted nesting relationship each having an axial slot therein and an axial key portion extending therefrom. An annular support element is disposed radially inwardly of the nesting annular seal elements to provide radial force on the nesting seal elements thereby enhancing the sealing characteristics of the assembly.

Hydraulic fluid sealing applications often require robust double-acting seal assemblies for pistons or rods, or any axially displaceable machine part moveable through an annular passage in a complementary part. These seal assemblies provide a fluid barrier between reciprocating piston rods or pistons and a fluid under pressure by means of a dynamic sealing element that provides radial force against a rod shaft or a piston wall, thereby preventing fluid flow from an area of high pressure to an area of low pressure.

In high pressure fluid system applications, for example heavy machinery hydraulic systems, it is well known in the art to use seal assemblies such as "T" seals, capped "T" seals, glide ring piston seals, or thermoplastic sealing rings employing step joints arranged in series along the axis of a shaft or piston to prevent high pressure fluid from leaking past the seals. The upstream seals in these multi-seal arrangements, known as buffer seals, serve to protect the primary rod or piston seal from high-pressure surges, thereby extending the useful life thereof.

However, the aforementioned conventional seal assemblies suffer from several disadvantages. "T" seals typically comprise a soft dynamic sealing element nested with a pair of back-up rings disposed in a seal gland. The soft sealing element, while providing excellent non-dynamic sealing properties (very little drift), nonetheless is subject to wear and proves unable to bridge small ports because of its tendency to extrude into a port when under pressure.

Capped "T" seals, more robust than "T" seals, are typically comprised of a PTFE material cap, an elastomeric energizer, and a pair of anti-extrusion rings. The PTFE element reduces the tendency of the seal to wear over time but is expensive and difficult to install because it must be stretched into place. Additionally, the PTFE element is too soft to bridge small ports and can trap and hold contaminants that cause cylinder bore scoring.

The glide ring piston seal also has a PTFE dynamic sealing element employed in conjunction with an elastomer o-ring to provide radial sealing force. This seal assembly has excellent resistance to drift, but the PTFE sealing element cannot bridge small ports and is subject to damage from contaminants in the fluid system. The glide ring piston seal is also difficult to install in a seal gland and is subject to cutting and chipping upon installation.

Other known-in-the-art piston seal assemblies employ advanced thermoplastic materials to provide rigid dynamic sealing elements that have exceptional port-bridging abilities and relatively long-life. Unfortunately, rigid dynamic sealing elements require a great deal of force to install, and are therefore vulnerable to installation damage. Additionally, the less flexible dynamic sealing elements require strict attention to manufacturing tolerances to obtain an accurate fit in the piston gland, thereby increasing unit cost.

BRIEF SUMMARY OF THE INVENTION

The instant invention solves the aforementioned problems by providing a seal assembly for a seal gland or groove having a pair of spaced axial walls and a radial wall in a relatively displaceable machine part. The seal assembly is comprised of a pair of identical annular seal elements arranged in an inverted nesting relationship disposed within the groove in proximity to the displaceable machine part to be sealed. The seal elements are made of a relatively hard, high strength plastic material resistant to wear from frictional forces, for example nylon. A resilient annular support element comprised of an elastomer is disposed between the sealing elements and the radial wall of the seal gland to provide radial sealing force against the relatively displaceable machine part, thereby preventing the flow of fluid between the seal elements and the machine part.

The annular seal elements each have an axial slot therein, bounded by a pair of beveled end surfaces tapered from the exterior radius thereof to the interior radius thereof that prevent extrusion of the resilient support element into the axial slot. Each seal element further has a key portion extending axially therefrom, disposed 180 degrees away from the axial slot around the circumference of the annular sealing element. The key portion has tapered axial surfaces thereon that are shaped to engage the tapered surfaces of the axial slot of an inverted seal element, thereby providing a pair of inverted nesting elements.

The key portion of the annular seal elements has an axial dimension slightly smaller than the axial dimension of the complementary axial slot in the opposing element. This feature of the instant invention causes the seal element oriented in the upstream (high pressure) direction to be forced by system pressure against the complementary element thereby sealing the axial mating surfaces thereof and preventing fluid flow between the nesting seal elements.

Optimum operation of the seal assembly obtains when the axial width of the pair of inverted, nesting seal elements is slightly less than the distance between the axial walls of the seal gland. This feature of the instant invention allows the seal elements to float in the gland while maintaining each element in close proximity to it's complement such that a reverse in pressure direction rapidly forces the elements together to maintain a leak-proof seal.

The annular support element has an axial dimension less than the axial width of the pair of inverted nesting seal elements. This feature of the present invention allows for thermal expansion of the assembly in the seal gland and prevents, for example, the expansion of the assembly to a point where friction between the seal elements and the relatively displaceable part causes additional thermal expansion, eventually resulting in catastrophic seal failure. Since the axial width of the support element is less than that of the seal elements, upon a change in pressure from one side of the seal assembly to another, the seal elements will be forced to the downstream axial wall of the seal gland in advance of the support element, thereby preventing the more resilient support element from extruding out of the seal gland. This axial motion of the support element also acts to force the nesting seal elements together, thereby maintaining a tight pressure seal.

The tapered surfaces of the axial slot in the seal elements closely engage the key portion of the complementary element, thereby prohibiting the more resilient support element from being forced into the axial slot when under pressure. The support element provides radial force on the seal elements, biasing the tapered surfaces thereof towards the key portion of the complementary element. This radial force prevents both leakage and extrusion of the support element into the small space where each slot and its complementary key portion engage.

Therefore one object of the instant invention is a seal assembly having a pair of identical nesting annular seal elements made from a high strength, relatively hard plastic material to provide exceptional resistance to wear.

A further object of the instant invention is a seal assembly having a pair of seal elements each having an axial slot therein and a complementary axial key portion thereon such that, when inverted, the axial slot engages the key portion of the complementary seal element.

A yet further object of the invention is to provide a seal assembly having a support element that ensures that the assembly retains proper orientation in the seal groove throughout the useful life thereof.

A yet further object of the instant invention is a seal assembly that is not subject to chipping or cutting upon installation.

A yet further object of the instant invention is a seal assembly having a pair of identical nesting seal elements comprised of a high strength, relatively hard plastic material that are capable of bridging small ports in relatively moving machine parts.

A yet further object of the instant invention is a seal assembly having extremely low drift characteristics.

Additional objects, features, and advantages of the present invention will become apparent from the subsequent detailed description, taken in conjunction with the accompanying drawing figures.

BRIEF DESCRIPTION OF THE SEVERAL VIEWS OF THE DRAWINGS

FIG. 4 is a perspective view of an alternative embodiment of the seal elements of the instant invention;

FIG. 5 is a view of the instant invention taken along the arrow 5 of FIG. 4; and FIG. 6 is a view of the instant invention taken along the arrow 6 of FIG. 4.

DETAILED DESCRIPTION OF THE INVENTION

Figure 1:
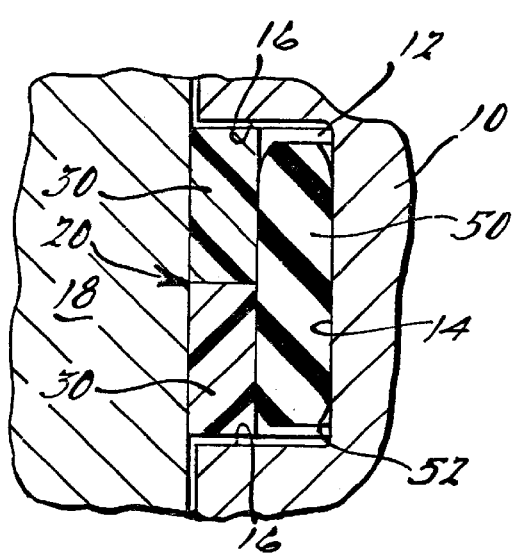
FIG. 1 is a fragmentary cross-section through the seal assembly of the instant invention.

Referring to drawing FIG. 1, and in accordance with the preferred embodiment of the instant invention, a relatively displaceable cylindrical machine part 10 has a circumferential groove 12 therein having a radially extending wall 14 and first and second axially spaced walls 16 for acceptance of a generally annular seal assembly 20. The seal assembly 20 comprises a pair of annular seal elements 30 arranged in an inverted nesting relationship and an annular support element 50 disposed between the nesting annular seal elements 30 and the radially extending wall 14 of the circumferential groove 12 to bias the annular seal elements toward a relatively stationary cylindrical machine part 18.

Figure 3:
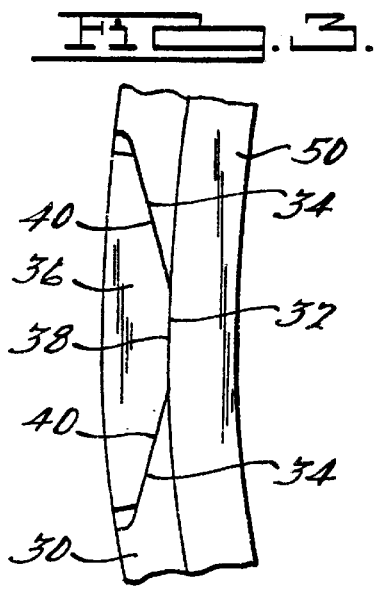
FIG. 3 is a view of the instant invention taken along the arrow 3 of FIG. 2.
Figure 2:
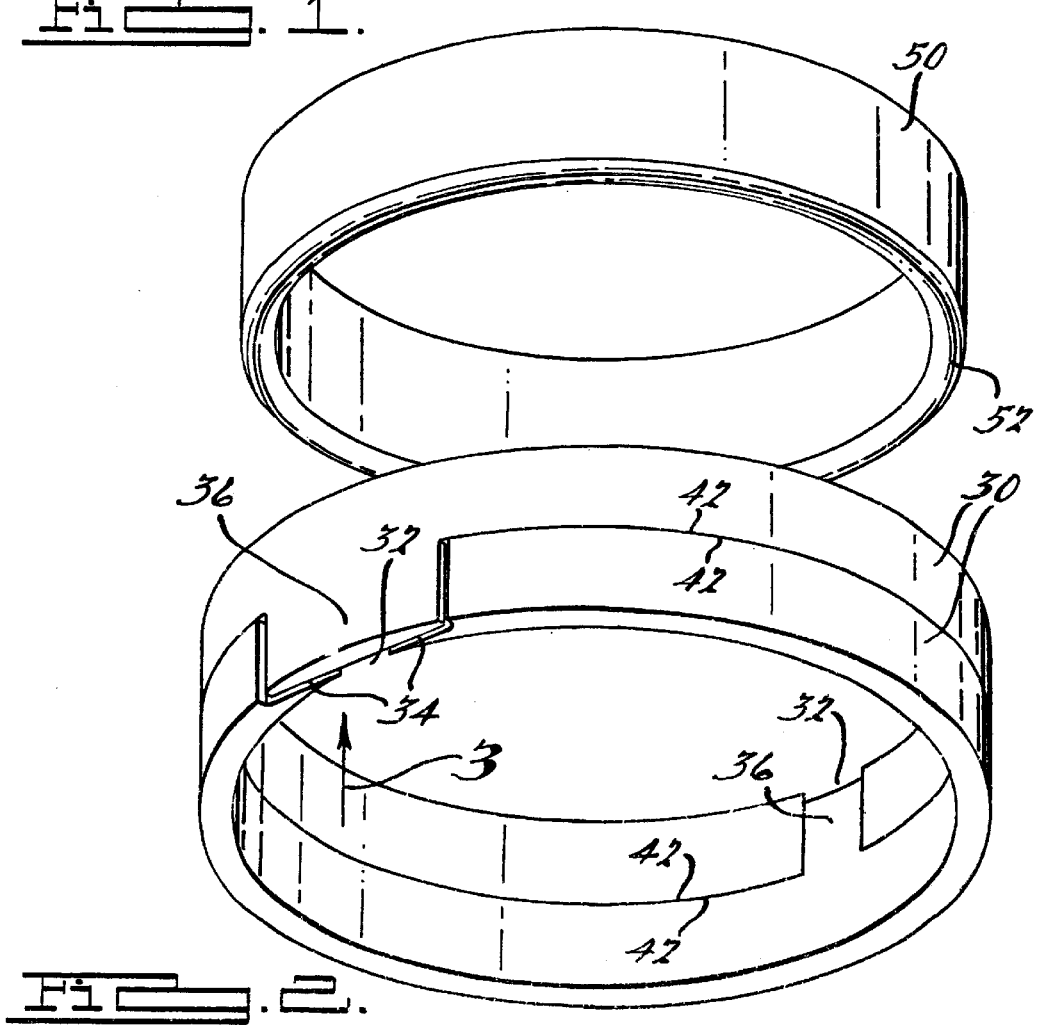
FIG. 2 is an exploded perspective view of the instant invention.

Referring to FIGS. 2 and 3, each annular seal element 30 has an axial slot 32 therein bounded by a pair of oppositely sloped axial surfaces 34 that extend both axially and radially therefrom. Each annular seal element 30 further has a key portion 36 extending axially from the element 30. In a preferred embodiment of the instant invention, the key portion 36 is disposed 180 degrees from the axial slot 32 around the circumference of the annular element 30. As best seen in FIG. 3, the key portion 36 has a delta-shaped cross section having a flattened apex 38 and a pair of opposed beveled surfaces 40 that slope oppositely away from the flattened apex 38.

One annular seal element 30 is inverted to allow the key portion 36 of the other element 30 to engage the axial slot 32 thereof. The axial surfaces 34 bounding the slot 32 of one element 30 are engaged by the beveled surfaces 40 of the key portion 36 of the other element, thereby providing a pair of seal elements 30 arranged in an inverted nesting relationship. Each seal element 30 is further provided with a flat axial surface 42 extending around the circumference thereof that is forced into close proximity with the corresponding axial surface 42 of the complementary element 30 to provide a tight seal. The annular seal elements 30 are comprised of a relatively hard wear resistant material, such as nylon.

The annular support element 50 is preferably comprised of a resilient, flexible, elastic material such as polyurethane or any of various elastomeric compounds suitable for use in sealing environments, as well known to one of ordinary skill in the art. The support element is disposed in the circumferential groove 12 between the radially extending wall 14 thereof and the nesting seal elements 30. The support element 50 biases the nesting seal elements 30 radially toward the relatively stationary machine part 18 thereby forcing the seal elements against the part 18 to effect the sealing thereof. The support element 50 is provided with corners 52 having a rounded cross-section to reduce chipping and cutting caused by movement of the seal elements 30 within the groove 12.

The axial surfaces 34 bounding the slot 32 of the annular seal elements 30 further prevent the extrusion of the softer annular support element 50 into the axial slot 32 when subjected to high pressure. This feature of the instant invention is an improvement over known-in-the-art seal assemblies that are subject to damage from extrusion of a softer support element when subjected to high pressure or shock loads, usually as a result of cylinder bore expansion.

As best seen in FIG. 1, in a preferred embodiment of the instant invention the combined radii of both the nesting annular seal elements 30 and the support element 50 are slightly larger than the distance from the radially extending wall 14 of the circumferential groove 12 to the relatively stationary machine part 18. This feature of the instant invention provides for interference between the seal assembly 20 and the machine part 18, thereby providing sealing force thereon.

Additionally, the axial dimension of the key portion 36 of each seal element 30 is preferably slightly less than the axial dimension of the axial slot 32 thereby engaged, as best seen in FIG. 2. This feature of the instant invention allows the upstream seal element 30 (the element located on the high-pressure side of a pressurized system) to be forced against the nesting downstream seal element 30 thereby inhibiting fluid flow therebetween.

In a preferred embodiment of the instant invention the axial dimension (width) of the pair of nested annular seal elements 30 is nominally less than the axial width of the circumferential groove 12. This feature allows the nested annular elements 30 to "float" axially within the circumferential groove 12, while keeping the elements 30 in close proximity to prevent pressurized fluid from passing through the potential "leak path." The "leak path" is the route taken by fluid to travel past the annular seal elements 30 from an area of high pressure to an area of lower pressure. The "leak path" of the instant invention is between the opposed beveled surfaces 40 of the key portion 36 and the surfaces 34 bounding the slot 32 of the complementary seal element 30, then 180 degrees around the nesting elements 30 between the flat parallel surfaces 42 where each element is forced against the other by operation of system pressure, to the complementary key portion 36 and slot 32. The instant invention is advantageous over known-in-the-art seal assemblies because of the relatively long "leak path" that inherently causes a pressure differential across the annular elements 30 even when the system pressure differential across the elements 30 is minimal.

In a preferred constructed embodiment of the instant invention the axial dimension (width) of the support element 50 is nominally less than the combined axial dimension of the nested annular seal elements 30. This feature of the invention allows the support element 50 to expand in volume in the circumferential groove 12 while preventing the seal assembly 20 from over-filling the groove 12, thereby causing seal damage or possibly failure. Additionally, this feature of the instant invention allows the nested annular seal elements 30 to shift against the downstream axial wall 16 of the circumferential groove 12 when system pressure shifts from one side of the seal assembly 20 to the other, prior to the support element 50 shifting to the downstream axial wall 16. This "leading" motion of the nesting elements 30 responsive to a pressure shift closes the small space between the downstream axial wall 16 of the circumferential groove 12 and the seal elements 30 thereby preventing extrusion of the softer support element 50.

Furthermore, the support element 50 biases the annular seal elements 30 opposite the radially extending wall 14, forcing the oppositely sloped surfaces 34 into close proximity. Accordingly, the pair of oppositely sloped surfaces 34 of each annular seal element 30 in this embodiment of the instant invention is disposed radially between the male key portion 36 of the complementary nesting seal element 30 and the annular support element 50. This embodiment of the instant invention provides superior retention of the seal elements 30 in the groove 12 during installation of the assembly 20, or when an irregularity, for example a port, in the relatively stationary machine part 18 is encountered by the seal assembly 20 as the relatively displaceable machine part 10 moves.

In an alternative embodiment of the instant invention as shown in FIGS. 4, 5, and 6, the annular nesting seal elements 30 have a groove 60 therein that extends both radially and circumferentially through the elements 30. The groove 60 is employed in place of the axial slot 32 of the preferred embodiment of the instant invention. Additionally, the elements 30 have an axial notch 62 therein, extending axially into, but not through the seal elements 30. The groove 60 is bounded by an opposed pair of beveled surfaces 64, each extending both radially and circumferentially, that are forced adjacent each other when the seal element 30 is subjected to radial compression or "squeeze" by the support element 50.

Each annular seal element 30 has a key portion 36 extending axially therefrom that engages the axial notch 62 of a corresponding inverted annular seal element 30. As shown in FIG. 4, the key portion 36 has a rectangular cross-section, but can be of any shape designed to closely engage the axial notch 62 of the corresponding inverted seal element 30. The axial dimension of the key portion 36 of each seal element 30 is preferably slightly less than the axial dimension of the axial notch 62 thereby engaged. This feature of the instant invention allows the upstream seal element 30 (the element located on the high-pressure side of a pressurized system) to be forced against the nesting downstream seal element 30 thereby inhibiting fluid flow therebetween.

One annular seal element 30 is inverted to allow the key portion 36 of the other element 30 to closely engage the axial notch 62 thereof, thereby providing a pair of seal elements 30 arranged in an inverted nesting relationship.

While the preferred embodiment of the instant invention is disclosed in detail, it will be appreciated by one of ordinary skill in the art that the instant invention is susceptible to various modifications without departing from the scope of the following claims.

What is claimed is:

1. A seal assembly for retatively movable cylindrical machine parts, one of the machine parts having a groove with first and second axially spaced walls and a radially extending wall, comprising:

a pair of annular seal elements each having an axial slot therein bounded by a pair of oppositely sloped axial surfaces and having an axially extending male key portion, the seal elements arranged in an inverted nesting relationship whereby the axial surfaces of one of the seal elements engage the male key portion of the elements; and an annular support element having an axial width less than the axial width of the groove, the support element disposed radially inwardly of the seal elements;

wherein the male key portion of each seal element has a radially inwardly directed delta shaped cross section comprising a flattened apex and opposed beveled surfaces sloped oppositely away from the apex and wherein the oppositely sloped axially surfaces of each seal element are each respectively oriented substantially parallel to one of the opposed beveled surfaces of the male key portion of the other seal element.

2. A seal assembly for relatively movable cylindrical machine parts, one of the machine parts having a groove with first and second axially spaced walls and a radially extending walls comprising:

a pair of annular seal elements each having an axial slot therein bounded by a pair of oppositely sloped axial surfaces and a male key portion extending axially from said seal elements, said seal elements arranged in an inverted nesting relationship whereby the axial surfaces of one of said seal elements engage the male key portion of the other of said elements; and an annular support element having an axial width less than the axial width of said groove to facilitate expansion therein said support element disposed radially inwardly of said annular seal elements;

wherein the axial dimension of the key portion of each seal element is nominally smaller than the axial slot of the other seal element to allow the key portion to be tightly forced into the axial slot when subjected to pressure.

3. A seal assembly for relatively movable cylindrical machine parts, one of the machine parts having a groove with first and second axially spaced walls and a radially extending wall, comprising:

a pair of annular seal elements each having a radial, circumferential groove therein forming a pair of oppositely beveled overlapping surfaces, a notch located proximate the circumferential groove extending axially into but not through each of the seal elements, and a male key portion extending axially from each of the seal elements, the seal elements arranged in an inverted nesting relationship whereby the notch of one of the seal elements engages the male key portion of the other of the seal elements; and an annular support element having an axial width less than the axial width of the groove, the support element disposed radially inwardly of the seal elements.

4. The seal assembly according to claim 3, wherein the axial dimension of the key portion of each seal element is nominally smaller than the axial dimension of the notch of the other seal element to allow the key portion to be tightly forced into the notch when subjected to pressure.

* * * * *

UNITED STATES PATENT AND TRADEMARK OFFICE
CERTIFICATE OF CORRECTION

PATENT NO. : 6,517,081 B2  
DATED : February 11, 2003  
INVENTOR(S) : Gordon T. Zitting and Todd Hagen It is certified that error appears in the above-identified patent and that said Letters Patent is hereby corrected as shown below:

Column 2,  
Line 50, change "it's" to -- its --

Column 6,  
Line 35, before "elements" insert -- other of the seal --  
Line 43, change "axially" to -- axial --  
Line 50, change "walls" to -- wall, --

Signed and Sealed this

Fifth Day of August, 2003

JAMES E. ROGAN  
*Director of the United States Patent and Trademark Office*